United States Patent Office 3,532,727
Patented Oct. 6, 1970

3,532,727
PROCESS FOR THE PRODUCTION OF
10-CHLOROPHENOXARSINE
Chun-Shan Wang, Thomas W. McGee, and Kuo Y.
Chang, Midland, Mich., assignors to The Dow Chemical Company, Midland, Mich., a corporation of Delaware
No Drawing. Filed July 25, 1969, Ser. No. 845,064
Int. Cl. C07d 105/06
U.S. Cl. 260—440                                   9 Claims

ABSTRACT OF THE DISCLOSURE

Method for the production of 10-chlorophenoxarsine which comprises the reaction of diphenyloxide and arsenic trichloride at an elevated temperature in the presence of a Lewis acid-Bronsted acid catalyst mixture. The Lewis acid-Bronsted acid catalyst mixture gives high yields and minimizes byproduct tar formation. The 10-chlorophenoxarsine is useful as an antimicrobial for the control of fungal and bacterial organisms.

BACKGROUND OF THE INVENTION

The known reaction of diphenyloxide and arsenic trichloride in the presence of aluminum chloride or aluminum bromide as a catalyst at a temperature not in excess of 200° C. provides yields of 10-chlorophenoxarsine of from about 30 to about 40 percent based upon the starting materials. Conducting the same reaction at a temperature in the range of from about 240° to 260° C., however, significantly increases the yield of the desired product to about 60 to 80 percent, but usually is accompanied by undesirable byproduct tar formation. The high temperature process is described and claimed in U.S. Pat. 3,371,105, granted Feb. 27, 1968.

The desired 10-chlorophenoxarsine product is useful as an antimicrobial for the control of various fungal and bacterial organisms such as *Fusarium oxysporum lycopersici*, *Rhizoctonia solani*, *Aspergillus terreus*, *Pullularia pullulans* and *Erwinia carotovora*. Accordingly, an improved process for the preparation of 10-chlorophenoxarsine which permits greater yields and related economic benefits than those obtainable under known methods is desirable.

OBJECTS OF THE INVENTION

It is an object of the present invention to provide an improved process for substantially increasing the yield of 10-chlorophenoxarsine over known processes.

An additional object is to provide a process for providing 10-chlorophenoxarsine in increased yields wherein the reaction product is essentially tar free and substantially cleaner than can be produced with prior catalytic reaction procedures.

SUMMARY OF THE INVENTION

These and additional objects and cognate benefits and advantages are achieved in and by practice of the present invention which comprises an improvement in the catalytic preparation at elevated temperatures of 10-chlorophenoxarsine wherein the improvement comprises reacting the starting materials in the presence of a two-component catalyst consisting essentially of a Lewis acid and a Bronsted acid, preferably, an aluminum halide compound as the Lewis acid component and sulfuric acid or sulfur trioxide as the Bronsted acid component. In accordance with the present invention, aluminum chloride, aluminum bromide and other Lewis acids mixed with certain Bronsted acids have unexpectedly been shown to be improved catalysts in the process for production of 10-chlorophenoxarsine at elevated temperatures. Of particular interest as catalysts are Lewis acids selected from the group consisting of aluminum chloride, aluminum bromide, antimony trichloride, zinc chloride and ferric chloride. Bronsted acids which are of particular interest are those selected from the group consisting of fluorosulfonic acid, trichloroacetic acid, sulfuric acid, fuming sulfuric acid and sulfur trioxide. Of these, the use of aluminum chloride or aluminum bromide with fuming sulfuric acid or sulfur trioxide, as indicated hereinbefore, is particularly advantageous since it has the desired yield-increasing activity of the desired product and undesirable tar formation is substantially minimized.

The new process comprises causing diphenyloxide and arsenic trichloride to react together in the presence of a mixture of a Lewis acid and a Bronsted acid as a catalyst and at a temperature in the range of from about 240° to about 285° C. Good results are obtained when employing substantially equimolar proportions of the reactants. Optimum yields are obtained in the employment of about 150 percent or greater molar excess of diphenyloxide. For optimum yields, the catalyst is employed in molar concentrations equivalent to from about 1 to 25 percent of the molar amount of the employed arsenic trichloride. On a weight basis, the catalysts are employed in proportions equivalent to from about 1 to 5 grams of Lewis acid to about 0.1 to 5 grams of Bronsted acid per gram mole of arsenic trichloride.

In the practice of the present invention, usually the Lewis acid is dispersed with stirring in the diphenyloxide reactant. The Bronsted acid is added to the arsenic trichloride. The latter mixture is controllably added gradually to, and thus reacted portionwise with the diphenyloxide-Lewis acid component. Controlled addition of the arsenic trichloride reactant to the diphenyloxide component is essential to assure the high yields of the present improved process. In the present specification and claims, the term "portionwise" is employed as inclusive of the concepts of multiple increments and/or a continuous stream. In such practice, the arsenic trichloride-Bronsted acid reactant is added to the diphenyloxide-Lewis acid reactant at such a rate that the temperature of the reaction mixture is at least 240° C.

The reaction of the present invention takes place smoothly at temperatures of from 240 to 285° C. and preferably at temperatures of from 245 to 270° C. It is essential for optimum product yields that the initial addition of the arsenic trichloride-Bronsted acid mixture to the diphenyloxide-Lewis acid mixture be carried out at temperatures of at least 240° C. as the addition of arsenic trichloride-Bronsted acid mixture at temperatures below 240° C. results in a material reduction of yields of the desired product. During a portion of the reaction, the boiling temperature of the reaction mixture is about 260° C.

However, as the reaction proceeds with the production of the 10-chlorophenoxarsine the boiling temperature of the reaction mixture advances so that toward the end of the reaction the temperature of the reaction can be raised to about 285° C. To insure completion of the reaction following the addition of the arsenic trichloride-Bronsted acid mixture, the temperature of the reaction mixture can be raised to from about 260 to 285° C. for a short period of time. Heating in excess of 285° C. for an appreciable period of time should be avoided as such operation has a deleterious effect upon the yield and purity of the desired products. Thereafter the reaction mixture is cooled and the product is separated by such conventional procedures as vacuum distillation, filtration and the like.

The method of manufacture with the catalyst of the present invention can alternatively be carried out as a continuous process. In such a procedure, the arsenic trichloride-Bronsted acid reactant is continuously metered portionwise into a recycling stream of diphenyloxide-Lewis acid reactant which has been heated to a temperature of from 240° to 260° C. During the recycling, the reaction is cooled and the precipitated 10-chlorophenoxarsine removed by filtration or decantation. In an alternative method of separation, the recycling reaction mixture is subjected to fractional distillation under reduced pressure to remove 10-chlorophenoxarsine.

DESCRIPTION OF THE PREFERRED EMBODIMENTS

The following examples illustrate the present invention but are not to be construed as limiting the same.

Example 1

Aluminum chloride (2.0 grams; 0.015 mole) is dispersed with stirring in diphenyloxide (170 grams; 1.0 mole) and the temperature of the resulting mixture is elevated to 250° C. Aresnic trichloride (90.8 grams; 0.5 mole) is placed in a dropping funnel. Fuming sulfuric acid (65% free $SO_3$; 0.2 gram; 0.002 mole) is added to the arsenic trichloride and the resulting solution is mixed to form a white cloudy solution. The arsenic trichloride-fuming sulfuric acid solution is added dropwise, with stirring to the diphenyloxide solution at such a rate that the temperature of the reaction mixture is maintained at from about 240° to 250° C. The addition occurs over a period of three to four hours. Upon completion of the addition of the arsenic trichloride, the temperature of the reaction mixture is gradually raised to 260° C. over a one hour period and maintained at that temperature for a period of time. A sample is then taken for infrared and gas liquid chromatography analysis. The infrared spectrum indicates that the reaction is 85 to 90 percent complete and gas liquid chromatography analysis indicates an 89 percent yield of 10-chlorophenoxarsine based upon arsenic trichloride. The reaction mixture is then allowed to cool to room temperature and the reaction flash is prepared for vacuum distillation. This procedure gives 118.2 grams (85.6% yield) of the desired 10-chlorophenoxarsine product as a white crystalline solid melting at 122° to 124° C.

Example 2

Diphenyloxide (170 grams; 1.0 mole) and aluminum chloride (2.0 grams; 0.015 mole) are combined and heated to 250° C. Sulfur trioxide (0.5 grams; 0.006 mole) is mixed with arsenic trichloride (90.8 grams; 0.5 mole) and the resulting solution is added dropwise with stirring to the diphenyloxide solution maintained at 240° to 250° C. over a period of about four hours, then increased to about 260° C. and maintained at that temperature for a short period of time to substantial completion of reaction. Upon completion of the reaction the 10-chlorophenoxarsine product is separated and recovered. A 90 percent yield, based upon arsenic trichloride, is indicated by gas liquid chromatography.

Example 3

The procedure of Example 1 is repeated substituting the indicated catalysts and obtaining the following yields.

TABLE

| Catalyst (grams) per mole of $AsCl_3$: | Yield percent |
|---|---|
| 4.0 aluminum trichloride<br>0.6 fluorosulfonic acid | 87 |
| 4.0 antimony trichloride<br>0.4 fuming sulfuric acid (15%)[1] | 85 |
| 4.0 zinc chloride<br>0.4 fuming sulfuric acid (15%) | 85 |
| 4.0 aluminum trichloride<br>2.0 sulfuric acid (95%)[2] | 85 |
| 4.0 zinc chloride<br>2.0 sulfuric acid (95%) | 83 |
| 2.0 antimony trichloride<br>0.6 fluorosulfonic acid | 81 |

[1] Percent free $SO_3$.
[2] Percent $H_2SO_4$.

We claim:

1. In an improved method for the production of 10-chlorophenoxarsine from the reaction of diphenyloxide and arsensic trichloride at a temperature of between about 240° and 285° C. in the presence of a catalyst, the improvement which comprises conducting the reaction in the presence of a Lewis acid-Bronsted acid catalyst mixture, said Lewis acid being selected from the group consisting of aluminum chloride, antimony trichloride, and zinc chloride, and said Bronsted-acid being selected from the group consisting of sulfuric acid, fuming sulfuric acid, fluorosulfonic acid, and sulfur trioxide, in proportions equivalent to from about 1 to 5 grams of Lewis acid to about 0.1 to 5 grams of Bronsted acid per gram mole of arsenic trichloride.

2. Method of claim 1 wherein the catalyst is a mixture of 4 gram proportions of aluminum chloride and 0.4 gram proportions of 65 percent fuming sulfuric acid.

3. Method of claim 1 wherein the catalyst is a mixture of 4 gram proportions of aluminum chloride and 1 gram proportions of sulfur trioxide.

4. Method of claim 1 wherein the catalyst is a mixture of 4 gram proportions of aluminum chloride and 0.6 gram proportions of fluorosulfonic acid.

5. Method of claim 1 wherein the catalyst is a mixture of 4 gram proportions of antimony trichloride and 0.4 gram proportions of 15 percent fuming sulfuric acid.

6. Method of claim 1 wherein the catalyst is a mixture of 4 gram proportions of aluminum chloride and 2 gram proportions of 95 percent sulfuric acid.

7. Method of claim 1 wherein the catalyst is a mixture of 4 gram proportions of zinc chloride and 0.4 gram proportions of 15 percent fuming sulfuric acid.

8. Method of claim 1 wherein the catlyst is a mixture of 4 gram proportions of zinic chloride and 4 gram proportions of 95 percent sulfuric acid.

9. Method of claim 1 wherein the catalyst is a mixture of 2 gram proportions of antimony trichloride and 0.6 gram proportions of fluorosulfonic acid.

References Cited

UNITED STATES PATENTS 2,767,114  10/1956  Urbschat et al. ---- 260—440 X
3,371,105  2/1968  McGee ------------ 260—440

HELEN M. McCARTHY, Primary Examiner

F. N. BELLAMY, Assistant Examiner

U.S. Cl. X.R.

424—297